WAVE-DELAY STRUCTURES

Filed Aug. 10, 1965

INVENTORS
J. ARNAUD, W. SOBOTKA
& M. DESBRUERES
BY Paul M. Craig, Jr.
ATTORNEY

INVENTORS
J. ARNAUD, W. SOBOTKA
& M. DESBRUERES
BY Paul M. Craig Jr.
ATTORNEY

United States Patent Office 3,432,776
Patented Mar. 11, 1969

3,432,776

WAVE-DELAY STRUCTURES

Jacques Arnaud, Walter Sobotka, and Maurice Desbrueres, Paris, France, assignors to CSF—Compagnie Generale de Telegraphie Sans Fil, a corporation of France Filed Aug. 10, 1965, Ser. No. 478,569
Claims priority, application France, Aug. 26, 1964, 986,208
U.S. Cl. 333—31 9 Claims
Int. Cl. H03h 7/30

ABSTRACT OF THE DISCLOSURE

A meander-type wave-delay structure including a number of parallel, identical, equidistant conductors each having its two extremities connected respectively to the preceding and subsequent conductors by rectilinear connections perpendicular to said conductors, each conductor being bent so as to form a central rectilinear portion connected to two rectilinear terminal portions parallel to said central portion through intermediate rectilinear portions which are substantially perpendicular to both the central portion and the rectilinear connections.

The present invention relates to wave-delay circuits for use in travelling wave tubes, and more particularly to improved "meander"-type delay structures.

It is known that a conventional meander type delay-line placed within a travelling wave tube parallelly to the electron beam for propagating an electromagnetic wave coupled to the beam, may serve as a guide for a "forward" fundamental space component and for a first "backward" space harmonic. (The terms "forward" and "backward" mean herein that the phase velocity and the group velocity have the same direction or opposite directions, respectively).

Now, whenever the backward wave is relatively intense along the line, the performances and correct functioning of the tubes with the forward wave are greatly impaired.

Figure 1:
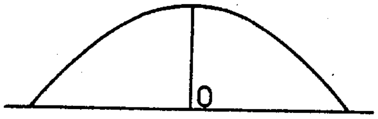
Figure 2:
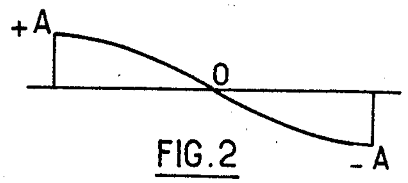

The distribution of the field along a conductor of a meander-type delay structure is represented in the accompanying drawing in FIGURE 1 for the forward fundamental space component and in FIGURE 2 for the backward space harmonic.

The fundamental space component (FIGURE 1) has a symmetrical distribution; the field is maximum at the middle of the conductor and zero at its two extremities, while the backward space harmonic (FIGURE 1) is antisymmetrical, its amplitude being +A at one extremity, —A at the other extremity and zero at the middle of each conductor.

Thus, it may be seen that the central portion of the meander-type line is the most useful for the utilization of the forward wave and the least exposed to the undesirable action of the backward wave, whereas the portions adjacent to the extremities of the conductors are, to the contrary, the most prejudicial by the presence of the backward wave and the least useful for energy propagation with the forward wave.

The present invention has as its object to modify the structure of a meander-type wave-delay circuit in such a way that the above-mentioned undesirable effects of the backward wave are eliminated or at least considerably reduced.

This result is achieved in accordance with the present invention by suitably bending the conductors which compose the delay structure.

Accordingly, the present invention provides a meander-type wave-delay structure, composed of parallel, identical and equidistant conductors, each of which has its two extremities connected to the preceding and subsequent conductors, respectively, characterized in that each conductor is bent so as to form a central portion connected to two terminal portions through intermediate portions which are subsantially perpendicular to both the central portion and the terminal portions.

Like the conventional meander-type delay line, the bent meander structure according to the present invention may have either the straight line form for use in rectilinear tubes, or the form rolled as a portion of a cylinder for use in cylindrical tubes.

The wave-delay structure, built in accordance with the present invention, makes it possible to couple to an electron beam the central portion of the conductors and to withdraw from this coupling the terminal portions of the conductors.

Figure 3:
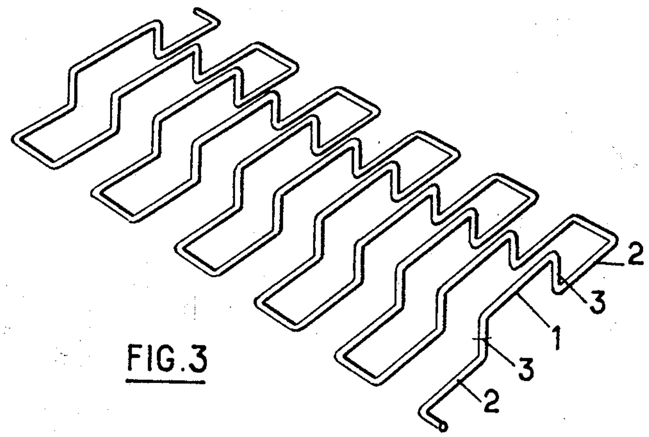
Figure 4:
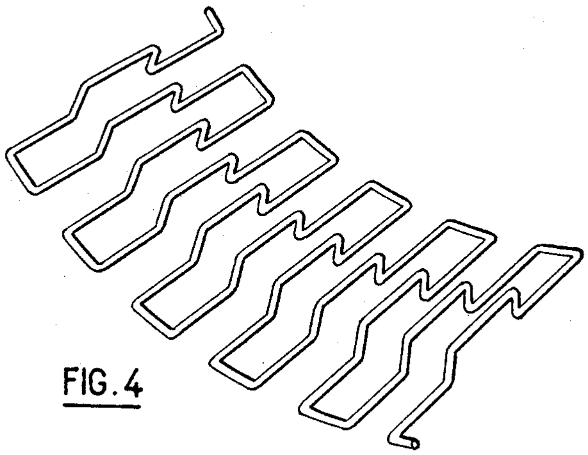
Figure 5:
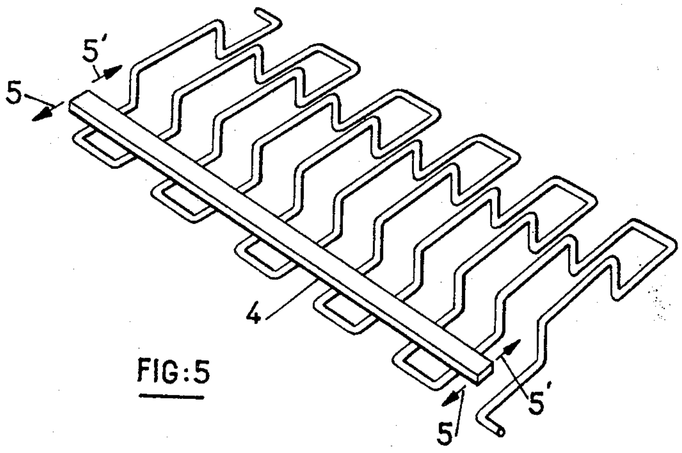
Figure 6:
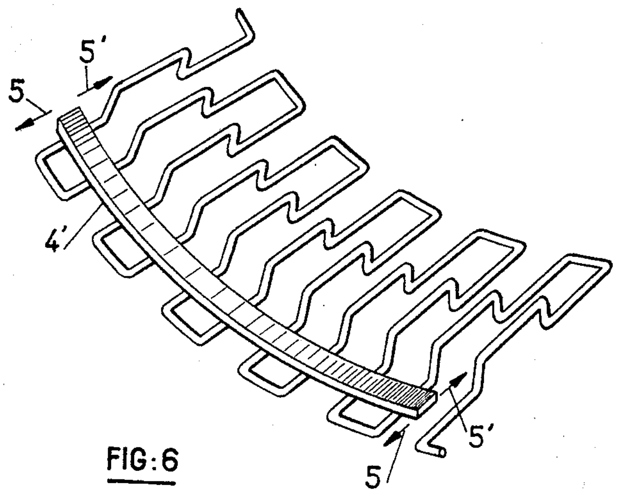

In the drawings, where the aforementioned FIGURES 1 and 2 are explanatory diagrams, FIGURES 3 and 4 represent, in perspective view, nonlimiting examples of embodiments in accordance with the present invention, and FIGURES 5 and 6 show, in perspective view, delay lines provided with a symmetry correcting device.

Referring now to FIGURE 3, which represents an example of a delay line in accordance with the present invention, it can be seen in this figure that the novel structure is a modification of the conventional meander-type line. In this modification each conductor is bent twice so as to form a central portion 1, connected to two terminal portions 2 through intermediate portions 3, the angles between successive portions being preferably 90°.

While FIGURE 3 shows a structure suitable for rectilinear tubes, FIGURE 4 represents a portion of a delay line made up by conductors bent like those of FIGURE 3, but disposed along cylindrical surfaces for use in cylindrical tubes.

When operating in travelling wave tubes, the delay structures of FIGURES 3 and 4 are coupled to the electron beam only by their central portions 1, and thus the inconveniences and drawbacks of the conventional meander lines are eliminated or considerably reduced in these novel bent lines.

Moreover, the novel structure presents a very important advantage for crossed-field tubes. These, in effect, are placed, as known, in the air-gap of a magnet or electromagnet that produces a magnetic field in the space traversed by the electron beam (interaction space). Since with the delay structure, described in the present invention, the electron beam is coupled only to the central portion of the conductors, the height of the interaction space is reduced and thus it becomes possible to use magnets or electromagnets whose air-gaps are shorter than those required in the case of conventional (non-bent) meander lines. This reduction in the air-gap height results in a notable reduction of the volume and weight of the magnets required for the operation of the tubes in question.

It should be noted that in tubes utilizing wave-delay lines of either the meander-type or the interdigital-type, the high-frequency output levels are substantially uniform over the entire operating frequency band if the lines are carried out and mounted in the tubes with a carefully realized symmetry. In contradistinction thereto, with an insufficient symmetry a portion of the frequency band is usually found to be attenuated in comparison with the remainder of the band.

This inconvenience of structures with an insufficiently perfect symmetry can be easily compensated with the aid of a correcting segment made either of metal or of an insulating material and disposed near either of the line edges. Such segments are represented at 4 and 4' in FIGURES 5 and 6.

By displacing the correcting segment 4 or 4' in either of the directions indicated by the arrows 5 and 5', one can find out the portion in which the high frequency output of the tube presents a uniform level over the entire band of operating frequencies; it then suffices to fix the segment in a solid or rigid manner in that position by any conventional means.

While we have shown and described several embodiments in accordance with the present invention, it is understood that the same is not limited thereto but is susceptible of numerous changes and modifications as known to a person skilled in the art, and we therefore do not wish to be limited to these details as described herein but intend to cover all such changes and modifications as are encompassed by the scope of the appended claims.

We claim:

1. A meander-type wave-delay structure comprising a number of parallel, identical and equidistant conductors each of which has its two extremities connected respectively to the preceding and subsequent conductors by rectilinear connections perpendicular to said conductors, each conductor being bent so as to form a central rectilinear portion connected to two rectilinear terminal portions parallel to said central portion through intermediate rectilinear portions which are substantially perpendicular to both the central portion and the rectilinear connections.

2. A wave-delay structure as claimed in claim 1, wherein the central portions of said conductors are disposed in a common plane.

3. A wave-delay structure as claimed in claim 1, wherein the central portions of said conductors are disposed along a cylindrical surface.

4. A wave-delay structure as claimed in claim 1, further comprising a symmetry correcting segment disposed near one of the edges of said structure substantially parallel to the longitudinal axis forming the axis of symmetry thereof.

5. A wave-delay structure as claimed in claim 4, wherein said correcting segment is made of metal.

6. A wave-delay structure as claimed in claim 4, wherein said correcting segment is made of an insulating material.

7. A meander-type delay structure, comprising a plurality of delay line portions, means interconnecting said delay line portions to form substantially a meander-type delay structure with a field distribution having spaced maximum amplitudes for the fundamental space component and the backward wave, and means in said delay structure to provide a closer coupling between an electron stream flowing substantially parallelly to said delay structure and the region of maximum amplitude of the field distribution for said fundamental space component than the reigon of maximum amplitude of the field distribution for the backward wave.

8. A meander-type delay structure, comprising a plurality of similar delay line portions, means interconnecting said delay line portions to form substantially a meander-type delay structure with a field distribution having spaced maximum amplitudes for the fundamental space component and the backward wave with the field distribution for the former being symmetrical and for the latter antisymmetrical, and means in said delay structure to provide a closer coupling between an electron stream flowing substantially parallelly to said delay structure and the region of maximum amplitude of the field distribution for said fundamental space component than the region of maximum amplitude of the field distribution for the backward wave.

9. A meander-type wave-delay structure comprising a number of conductors each of which has its two extremities connected respectively to the preceding and subsequent conductors by rectilinear connections angularly disposed with respect to said conductors, each conductor being bent so as to form a central rectilinear portion connected to two terminal rectilinear portions through intermediate rectilinear portions which are angularly disposed to both the central portion and the rectilinear connections.

References Cited

UNITED STATES PATENTS

| | | | |
|---|---|---|---|
| 3,230,485 | 1/1966 | Sobotka. | |
| 2,925,567 | 2/1960 | Eichen. | |
| 2,939,035 | 5/1960 | Reverdin | 315—3.5 |
| 2,956,204 | 10/1960 | Dohler et al. | 315—39.3 |

ELI LIEBERMAN, *Primary Examiner.*

C. BARAFF, *Assistant Examiner.*

U.S. Cl. X.R.

315—3.5, 3.6